United States Patent
Kujat et al.

(10) Patent No.: US 6,964,330 B2
(45) Date of Patent: Nov. 15, 2005

(54) ELEVATED GRADE STATION DRIVE SYSTEM

(75) Inventors: Darryl Irwin Kujat, Salmon Arm (CA); Geoff David Wight, Salmon Arm (CA); Edward K. Apted, Salmon Arm (CA); Darren A. Ross, Salmon Arm (CA); Danny C. White, Salmon Arm (CA)

(73) Assignee: COE Newnes/McGehee, ULC, Salmon Arm ( * ) Notice: Subject to any disclaimer, the term of this patent is extended or adjusted under 35 U.S.C. 154(b) by 0 days.

(21) Appl. No.: 10/856,846

(22) Filed: Jun. 1, 2004

(65) Prior Publication Data
US 2004/0238327 A1 Dec. 2, 2004

Related U.S. Application Data (60) Provisional application No. 60/474,213, filed on May 30, 2003.

(51) Int. Cl.⁷ .............................................. B65G 47/08
(52) U.S. Cl. ............................... 198/460.1; 198/464.1; 198/459.7; 198/461.1; 198/436; 198/437; 209/520; 209/521
(58) Field of Search ......................... 198/464.1, 464.3, 198/459.7, 460.1, 461.1, 435, 436, 437; 700/228; 209/517, 518, 520, 521, 541

(56) References Cited

U.S. PATENT DOCUMENTS

| | | | | |
|---|---|---|---|---|
| 3,805,420 A | * | 4/1974 | Crum | 37/305 |
| 3,894,625 A | | 7/1975 | Boyle et al. | |
| 3,913,744 A | * | 10/1975 | Turner et al. | 198/367 |
| 4,195,346 A | * | 3/1980 | Schroder | 700/167 |
| 4,219,120 A | * | 8/1980 | Rysti | 209/521 |
| 4,453,627 A | | 6/1984 | Wilkins | |
| 4,653,630 A | | 3/1987 | Bravin | |
| 4,765,456 A | | 8/1988 | Bower | |
| 4,815,768 A | * | 3/1989 | Applebaum et al. | 283/67 |
| 4,858,768 A | * | 8/1989 | Plester | 209/3.1 |
| 4,879,752 A | * | 11/1989 | Aune et al. | 382/141 |
| 5,419,425 A | | 5/1995 | Goater | |
| 5,524,771 A | * | 6/1996 | Kairi et al. | 209/518 |
| 5,634,551 A | | 6/1997 | Francioni et al. | |
| 5,685,410 A | | 11/1997 | Ritola et al. | |
| 6,076,683 A | * | 6/2000 | Okada et al. | 209/656 |
| 6,220,423 B1 | | 4/2001 | Gagnon et al. | |
| 6,431,345 B2 | | 8/2002 | Burgener et al. | |
| 6,598,747 B1 | * | 7/2003 | Ahrens | 209/518 |
| 6,629,592 B2 | * | 10/2003 | Bernard et al. | 198/360 |
| 6,659,266 B2 | | 12/2003 | Therrien et al. | |
| 6,659,287 B1 | * | 12/2003 | Hawkins | 209/538 |

FOREIGN PATENT DOCUMENTS

WO    WO 97/38929    10/1997

\* cited by examiner

Primary Examiner—Douglas Hess (57) ABSTRACT

An elevated grade station drive system includes a plurality of conveyor sections for conveying workpieces downstream at a variable transfer speed along and between the plurality of sections according to control instructions provided by a control system. The output from at least one workpiece position sensor cooperates with corresponding upstream conveyor sections and provides workpiece position data to the control system. Each conveyor section has a corresponding variable frequency drive cooperating in variable speed driving engagement therewith. The control system controls each variable frequency drive so as to interlock adjacent conveyor sections for smooth translation of the workpieces between adjacent conveyor sections without crushing or binding the workpieces. The plurality of conveyor sections may include a plurality of lugged conveyors, which may be lugged chains.

10 Claims, 7 Drawing Sheets

ELEVATED GRADE STATION DRIVE SYSTEM

CROSS REFERENCE TO RELATED APPLICATION

This application claims priority from U.S. Provisional Patent Application No. 60/474,213 filed May 30, 2003 entitled Elevated Grade Station Drive System.

FIELD OF THE INVENTION

The present invention relates generally to variable frequency drives and more specifically it relates to a material handling system with electronic interlock of position for multiple variable speed drives for controlling the relative position of the variable speed drives where the relative position varies as the system speed changes.

BACKGROUND OF THE INVENTION

It can be appreciated that variable frequency drives have been in use for years. typically, variable frequency drives are comprised of mechanically linked systems.

The main problem with conventional variable frequency drives is controlling system speed changes in mechanically linked systems. Another problem with conventional variable frequency drives are tuning of gearing between drives for each selected speed. another problem with conventional variable frequency drives is that mechanically linked systems generally require the purge of all material in the system prior to changing speed to avoid system crashes (for example boards being pinched or crushed between improperly meshing lugs on adjacent conveyors) or errors in material routing. Another problem with mechanically linked systems is that portions of the system cannot be deactivated without physically removing mechanical links such as sprockets, chains, or belts.

The present invention substantially departs from the conventional concepts and designs of the prior art so as to provide an apparatus primarily developed for the purpose of controlling the relative position of variable speed drives where the relative position varies as the system speed changes. In addition, the present invention allows the electronic disabling of a section of the system while still properly routing the entrained material to the remaining active section of the system as well as maintaining the correct relative positional relationships between adjacent conveyors and the like for proper handling of the entrained material.

SUMMARY OF THE INVENTION

In view of the foregoing disadvantages inherent in the known types of variable frequency drives now present in the prior art, the present invention provides a new material handling system with electronic interlock of position for multiple variable speed drives wherein the same can be utilized for controlling the relative position of variable speed drives where the relative position varies as the system speed changes.

The present invention may include material position sensors on some or on each of the variable frequency drives. The position output of the sensors is used by a control system to control the variable frequency drive attached to each section such that the position of each drive correctly interlocks its conveyor and lugs with adjacent conveyors and lugs at each material location as the system speed ramps up or down or remains constant. The position sensors information is also used by the control system to maintain the proper material position as sections of the system are disabled.

One embodiment of the invention is set out below in detail. It is to be understood however that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

It is merely one object of the present invention to provide a material handling system with electronic interlock of position for multiple variable speed drives that synchronizes grading stations with an infeed elevator and lugged incline transfer.

Another object is to provide for one or two of the grading stations being disabled, while enabling the system to electronically control the position of the remaining material handling drives such the material is properly presented to the active sections of the conveyance system in time or in phase.

To the accomplishment of the above and related objects, this invention may be embodied in the form illustrated in the accompanying drawings, attention being called to the fact, however, that the drawings are illustrative only, and that changes may be made in the specific construction illustrated.

In summary, the elevated grade station drive system according to one embodiment of the present invention may be characterized as a material handling system which includes a plurality of conveyor sections for conveying workpieces downstream at a variable transfer speed along and between the plurality of sections according to control instructions provided by a control system. The output from at least one workpiece position sensor cooperates with corresponding upstream conveyor sections and provides workpiece position data to the control system. Each conveyor section has a corresponding variable frequency drive cooperating in variable speed driving engagement therewith. The control system controls each variable frequency drive so as to interlock adjacent conveyor sections for smooth translation of the workpieces between adjacent conveyor sections without crushing or binding the workpieces. The plurality of conveyor sections may include a plurality of lugged conveyors, which may be lugged chains.

Workpiece position sensors may be provided for each conveyor section. The corresponding workpiece position data is used by the control system to control each corresponding variable speed drive so as to interlock the adjacent conveyor sections as conveyor translation speed increases or decreases according to the control instructions from the control system.

The plurality of conveyor sections may include a plurality of workpiece inspection conveyor sections for the simultaneous inspection of workpieces fed from an infeed section. Workpiece diverting means are provided for diverting workpieces from the infeed section to disperse the workpieces for inspection along the plurality of workpiece inspection conveyor sections. The workpiece diverting means may include a lugged inclined conveyor section for transporting workpieces from the infeed conveyor section to and past selectively actuable workpiece flow diverters for selectively diverting workpieces according to the control instructions of the control system to the plurality of inspection conveyor sections so as to divide the infeed piece rate of the infeed conveyor section by the number of the inspection conveyor sections. The workpiece flow rate of workpieces on each workpiece inspection conveyor is thereby reduced. A workpiece collection conveyor section downstream of the plurality of workpiece inspection conveyors cooperates with so as to collect the workpieces from the inspection conveyors and delivers the workpieces to an outfeed conveyor section.

In the illustrated embodiment, the workpieces are lumber to be graded and the plurality of workpiece inspection conveyor sections convey the lumber past corresponding lumber grading stations.

The inspection conveyors may operate in parallel. The workpieces may be fed in serially on the infeed conveyor section and the inclined conveyor section. They may be collected and fed out serially from the inspection conveyors.

BRIEF DESCRIPTION OF THE DRAWINGS

In the accompanying drawings like reference characters designate the same or similar parts throughout the several views. The present invention will be described in detail using the material handling system of a modem lumber manufacturing planer mill as an example.

DETAILED DESCRIPTION OF EMBODIMENTS OF THE INVENTION

Turning now descriptively to the drawings, in which, as stated above, similar reference characters denote similar elements throughout the several views, the attached figures illustrate one embodiment of a material handling system 10 using electronic interlocking of material position. Position output information of position sensors (not shown) is used by a control system 12 to control variable frequency drives mounted to corresponding conveyor sections 16a–16e such that the position of each drive and conveyor provides for interlocking hand-off of material, for example boards 18, between adjunction conveyors at each of the board hand-off locations 20a–20d as the system speed ramps up or down or remains constant.

Figure 1:
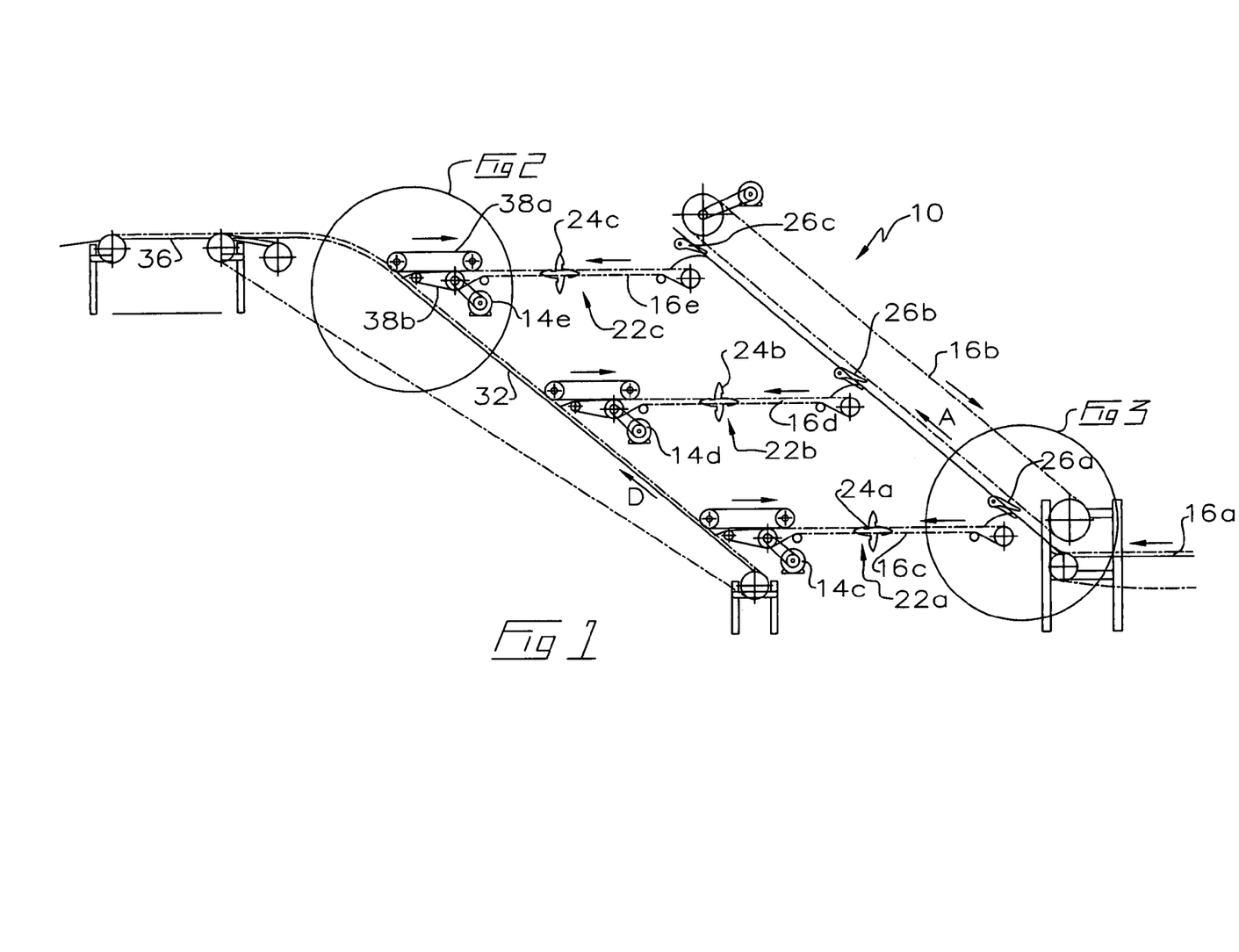
FIG. 1 is, in side elevation, partially cut away view, a series of elevated grade stations in a lumber manufacturing planer mill configuration.
Figure 1A:
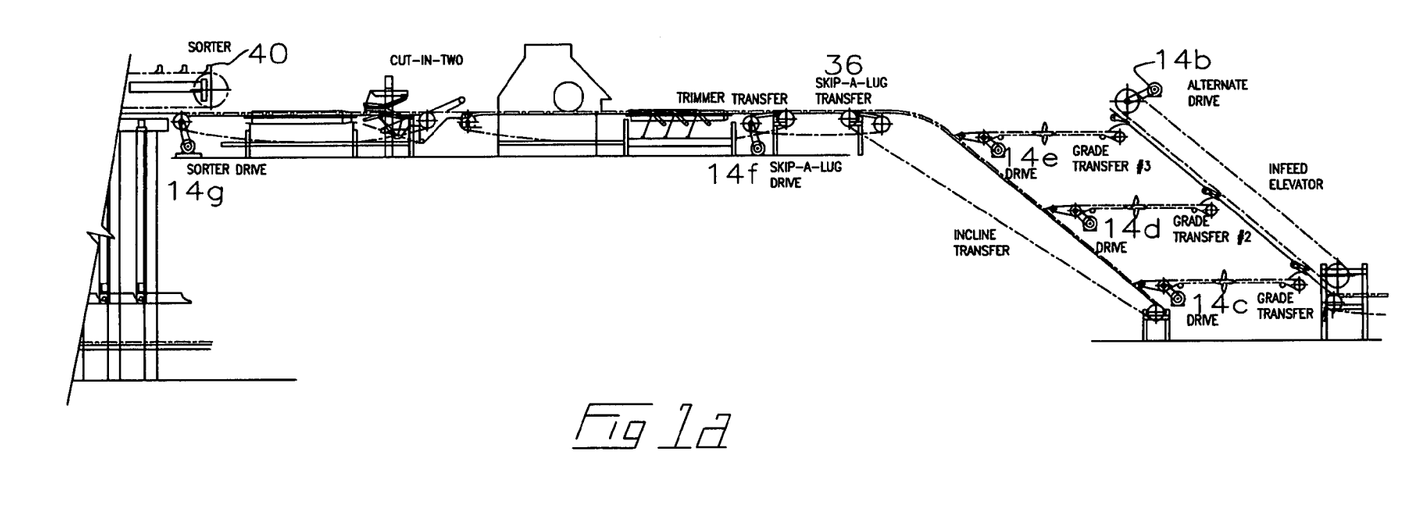
FIG. 1a is a schematic side elevation view of the present invention installed in a lumber manufacturing planer mill configuration.
Figure 2:
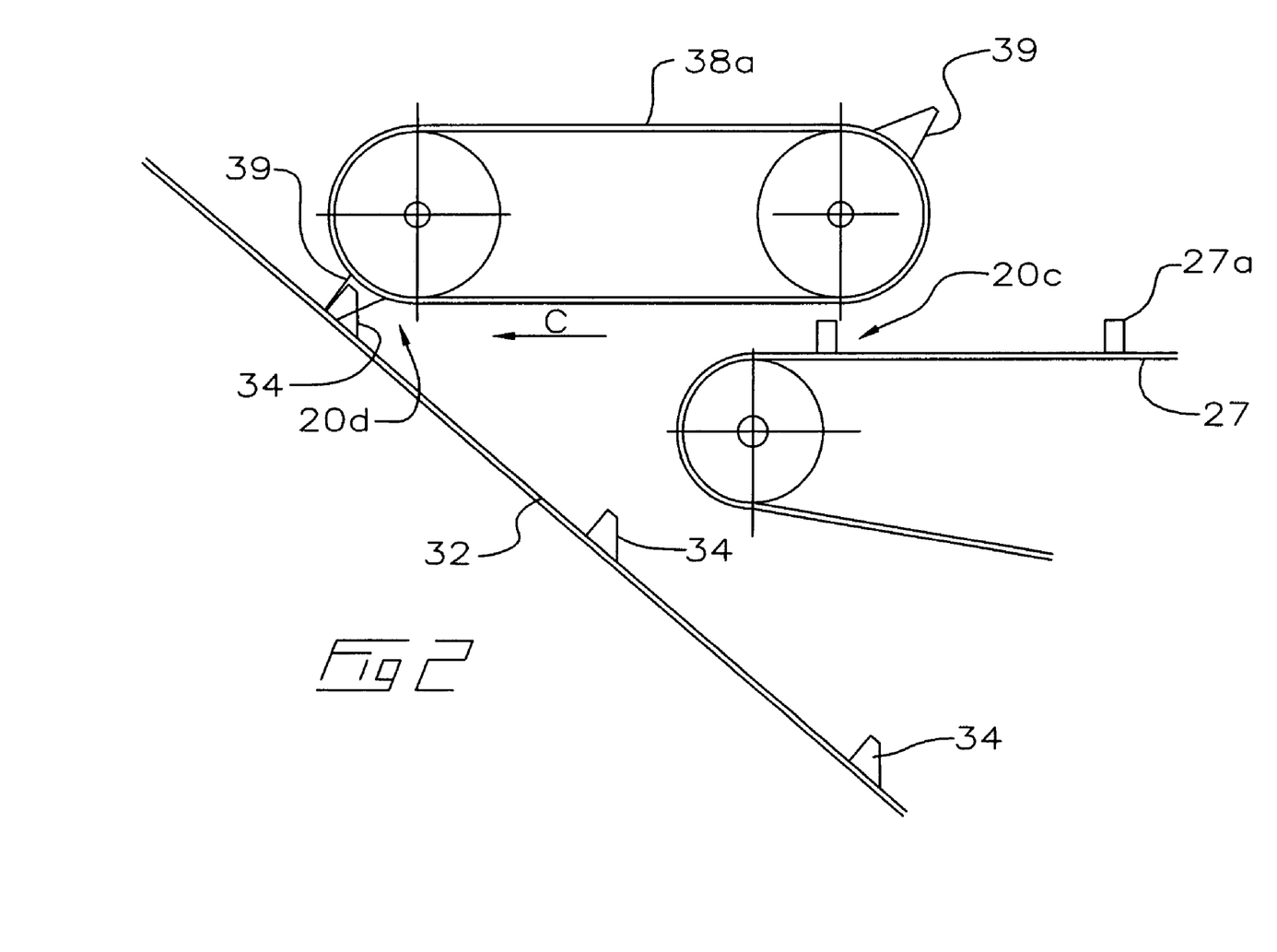
FIG. 2 is a diagrammatic simplified view of the downstream hand off from a grade station conveyor to an outfeed transfer conveyor.
Figure 3:
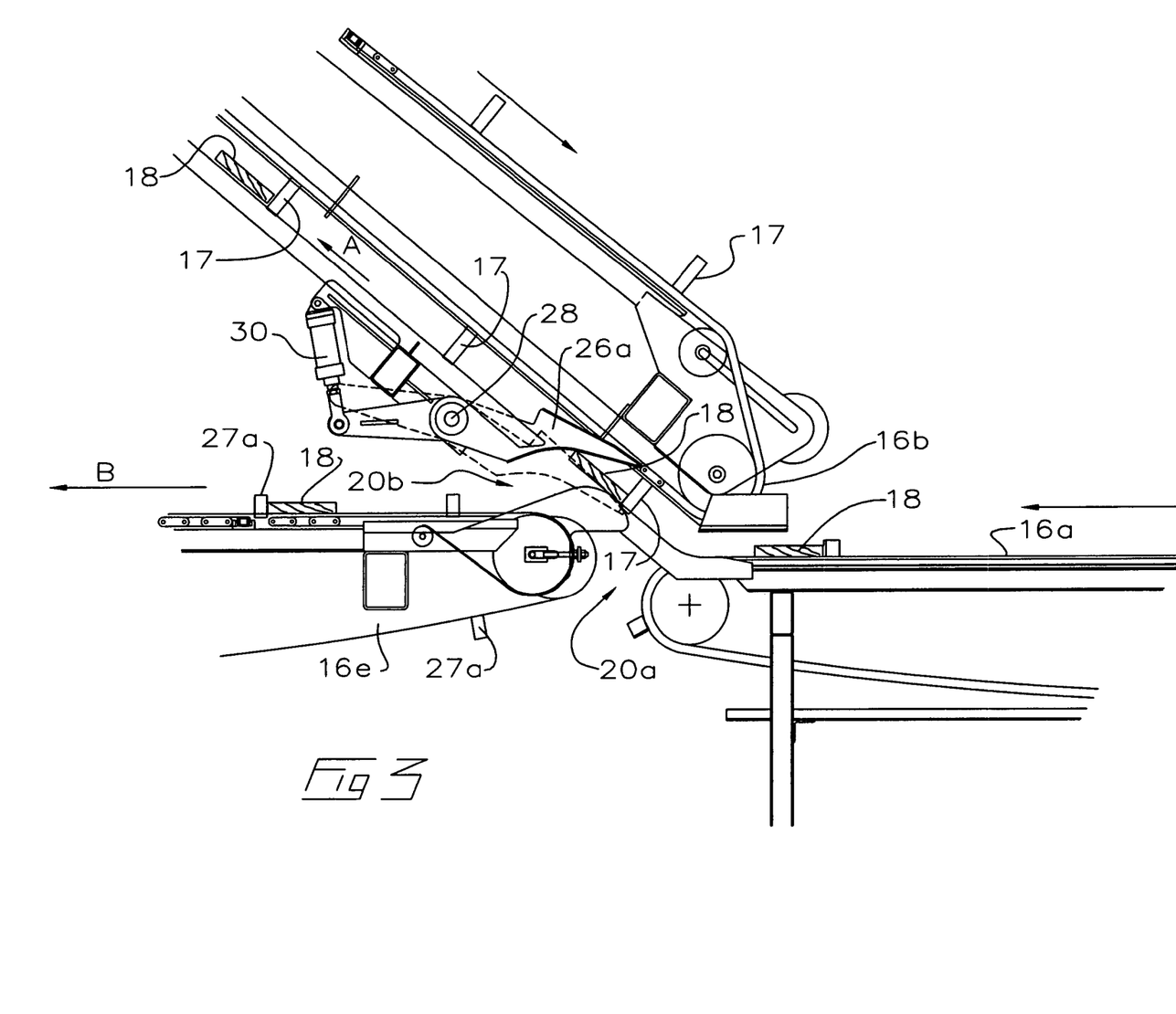
FIG. 3 is an enlarged view of a portion of FIG. 1.

FIG. 1 is a diagram representing the flow of material in the example of a lumber manufacturing planer mill having in the illustrated example, three grading Stations 22a–22c. With all three grading stations active, boards 18 enter on the infeed transfer 16a and are divided equally to the three grade stations. For example if 120 pieces of material per minute enter the system then each grade station will get 40 pieces per minute evenly spaced so a grader person standing at each grading station adjacent the corresponding board turner 24a–24c can process the pieces at a lower rate. The lugged endless conveyor of infeed elevator 16b carries boards 18 on lugs 17 in direction A to the station diverters 26a–26c. Diverters 26a–26c pivot on pins or shafts 28 by the actuation of cylinders 30. The diverters route the segregated boards in direction B past the individual grade stations on conveyors 16e, urged by lugs 27a. The material then is collected by inclined transfer 32 on lugs 34 and carried in direction D to the skip-a-lug transfer 36 and is kept separated and deposited in individual locations on the conveyance system. The graded lumber is further processed through the system and finally routed to a sorter. In particular, boards 18 are conveyed in direction C from handoff 20c to handoff 20d by upper and lower belts 36a and 36b. Belt 38a has lugs 39.

Figure 4:
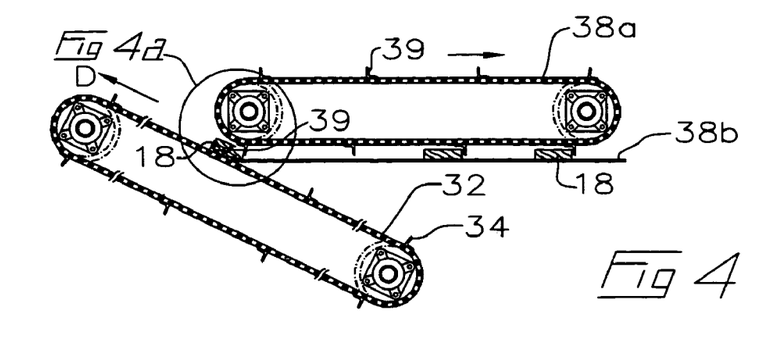
FIG. 4 is a diagrammatic view of incorrect positioning of the outfeed from a grading station.
Figure 4A:
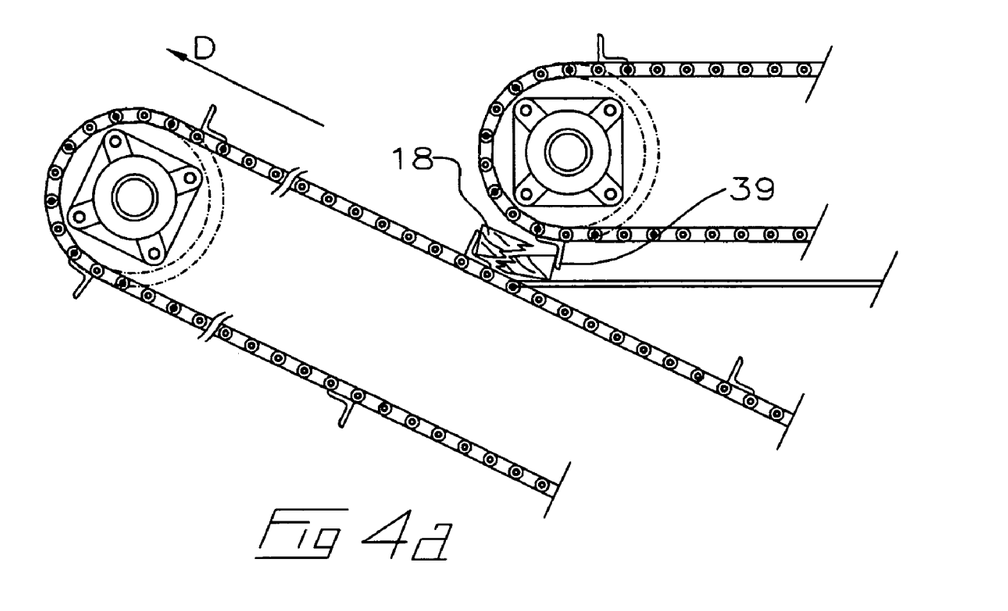
FIG. 4a is an enlarge view of a portion of FIG. 4.
Figure 5:
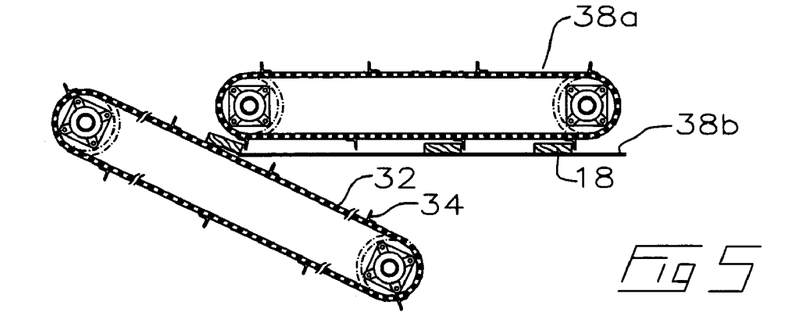
FIG. 5 is a diagrammatic view of correct positioning of the outfeed of boards from a grading station.
Figure 6:
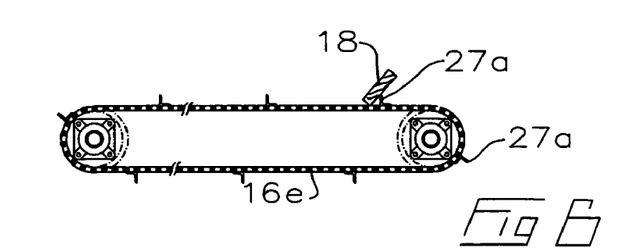
FIG. 6 is a diagrammatic view of the result of incorrect positioning of lugs on the infeed conveyor to a grading station transfer resulting in a board not being placed fully within a lug spacing.

The control of relative position of variable speed drives where the relative position varies as the system speed changes has been a difficult problem to solve with mechanically linked systems. Such mechanically linked systems require fine tuning of the "gearing" between drives for each selected speed. In addition, such systems may require the purge of all material in the system prior too changing speed to avoid system crashes (such as seen in FIGS. 4 and 4a) or errors in material routing. This invention provides a solution to this problem by placing a position sensor on each drive, and using the position output of these sensors to control the variable frequency drive attached to each section such that the position of each drive correctly matches the required positions at the boards and lugs (such as seen in FIG. 5) at each handoff location as the system speed ramps up or down or remains constant. Correct positioning of the conveyors is further explained by reference to FIGS. 6 and 7 for the hand off of the boards 18 from infeed transfer 16a in FIG. 1 to Grade Transfers 16e.

Figure 7:
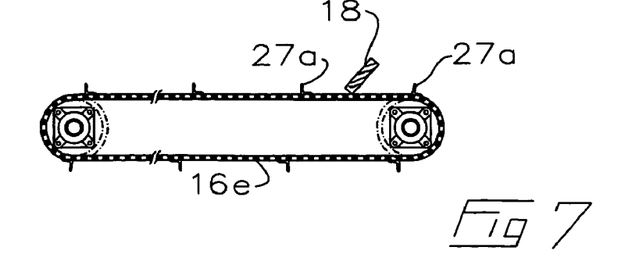
FIG. 7 is a diagrammatic view of FIG. 6 showing a board being correctly placed into the lug spacing on a grading station transfer.

FIG. 7 shows the position relationship between the transfers for successful handoff. The board must end up in the correct space for reasons of the control system tracking board specific grade information as the board as conveyed from the infeed through the system and finally arriving in the correct bin in the sorter.

Another example of correct positioning is shown in FIG. 5 where the board is transferred from the grade transfer 16e, via transfers 38b, to the incline transfer 32. FIG. 5 shows the correct positioning for successful hand off. FIGS. 4 and 4a show pinching or crushing of the board between mis-timed lugs.

Figure 8:
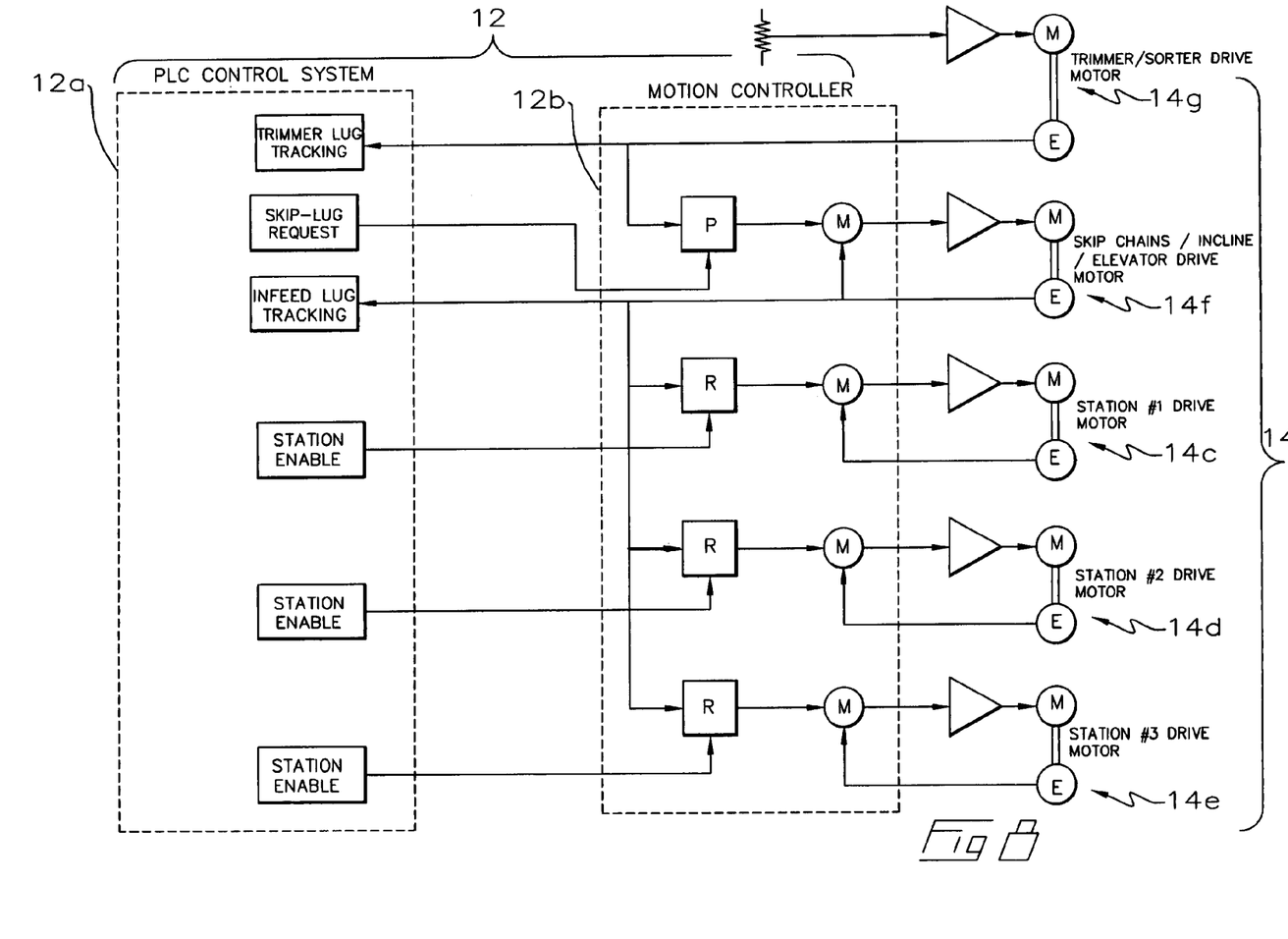
FIG. 8 is a control system block diagram.

The multiple inclined lumber grading station system as an example of the invention involves the use of five variable frequency drives: one for the sorter drive, one for the skip a lug drive, and three grading station drives, that is, one for each individual grading station. The infeed elevator conveyance drive 14b may be mechanically linked to the skip-a-lug drive 14f, or may be driven with an alternative position locked variable frequency drive. FIG. 8 shows the general arrangement of the position control loops for each drive. The sorter drive 14g is controlled to a speed by the PLC control system 12a. The position sensor information from the sorter 40 is fed to the motion controller 12b and is compared to the skip-a-lug transfer position 36 to provide the signal that drives the skip-a-lug variable frequency drive 14f.

A position sensor feedback is used with each of the above mentioned drives. A motion controller 12b uses these sensor signals to control the speed and position of the skip-a-lug and grade station variable frequency drive's (14c–14f) and their associated lugged transfers. The timing for the whole system is based on the position sensor of the sorter drive. The skip-a-lug drive synchronizes speed and position with the sorter drive. The skip-a-lug variable frequency drive drives the infeed elevator transfer and the lugged incline transfer. Each of the grading station drives is synchronized to the speed and position of the skip-a-lug drive. The grading stations are therefore synchronized with the infeed elevator and lugged incline transfer. As the sorter drive changes speed, the skip-a-lug drive changes speed to stay synchronized with the sorter drive. In the event that the skip-a-lug drive needs to create an empty lug space for a cut-in-two board, the skip-a-lug drive slows down momentarily relative to the sorter drive. This creates an empty lug space. The grade station drives follow the position and speed of the skip-a-lug drive during this speed change so that the system stays synchronized.

The infeed elevator introduces the boards into the multiple grading station transfers. The system is designed such that this infeed rate of boards is separated equally into the number of grading stations that are available to accept the material. For example, if the infeed elevator 16b has a product rate of one hundred twenty boards per minute, and there are three grading station conveyors 16a–16c able to accept boards 18, each grading station 22a–22c will process forty boards 18 per minute. The lugged incline transfer 32 removes the boards 18 from the grading station transfers 16a–16c. The total number of grade stations that are able to accept boards can be modified to suit operating conditions. Due to the fact that each grading station transfer is synchronized with the infeed elevator, the timing relationship must change to suit the total number of grading stations that are accepting boards. The motion controller uses the position sensors mounted on each of the grading station transfers to set the timing positions and speeds for all combinations of available grading stations. When a grading station is put off-line, the motion controller parks its transfers so that their lugs will not interfere with the transport of boards on the skip-a-lug incline transfer.

The use of lugged transfers as the conveyance means is described here as a means of describing the invention, other conveyance means are possible and included in the invention. Such other conveyance means could include smooth chains, belts, and others well known in the art.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A material handling system comprising:

a plurality of conveyor sections for conveying workpieces downstream at a variable transfer speed along and between said plurality of sections according to control instructions provided by a control system, wherein output from at least one workpiece position sensor cooperates with corresponding upstream conveyor sections of said plurality of conveyor sections and provides workpiece position data to said control system, wherein each conveyor section of said plurality of conveyor sections has a corresponding variable frequency drive cooperating in variable speed driving engagement therewith, said control system controlling each said variable frequency drive by said control instructions so as to interlock adjacent conveyor section of said plurality of conveyor sections for smooth translation of the workpieces between said adjacent conveyor sections without crushing or binding the workpieces between said adjacent conveyor sections, wherein said plurality of conveyor sections include a plurality workpiece inspection conveyor sections for the simultaneous inspection of workpieces fed from an infeed section of said plurality of conveyor sections, wherein workpiece diverting means are provided for diverting workpieces from said infeed section to disperse said workpieces for inspection along said plurality of workpiece inspection conveyor sections, wherein said workpiece diverting means include a lugged inclined conveyor section for transporting workpieces from said infeed conveyor section to and past selectively actuable workpiece flow diverters for selectively diverting workpieces according to said control instructions to said plurality of said inspection conveyor sections so as to divide an infeed piece rate of said infeed conveyor section by the number of said inspection conveyor sections to thereby reduce the workpiece flow rate of workpieces on each workpiece inspection conveyor of said plurality of workpiece inspection conveyors.

2. The system of claim 1 wherein said workpieces are lumber to be graded and said plurality of workpiece inspection conveyor sections convey the lumber past corresponding lumber grading stations.

3. The system of claim 1 wherein a workpiece collection conveyor section downstream of said plurality of workpiece inspection conveyors cooperates with so as to collect the workpieces from said inspection conveyors and delivers the workpieces to an outfeed conveyor section.

4. The system of claim 3 wherein said inspection conveyors are substantially horizontal and said collection conveyor section is inclined.

5. The system of claim 4 wherein said inspection conveyors operate in parallel, and the workpieces are fed in serially on said infeed conveyor section and said inclined conveyor section, and are collected and fed out serially from said inspection conveyors.

6. A material handling system comprising:

a plurality of conveyor sections for conveying workpieces downstream at a variable transfer speed along and between said plurality of sections according to control instructions provided by a control system, wherein output from at least one workpiece position sensor cooperates with corresponding upstream conveyor sections of said plurality of conveyor sections and provides workpiece position data to said control system, wherein each conveyor section of said plurality of conveyor sections has a corresponding variable frequency drive cooperating in variable speed driving engagement therewith, said control system controlling each said variable frequency drive by said control instructions so as interlock adjacent conveyor sections of said plurality of conveyor sections for smooth translation of the workpieces between said adjacent conveyor sections without crushing or binding the workpiece between said adjacent conveyor sections, wherein said at least one workpiece position sensor includes a workpiece position sensor for each conveyor section of said plurality of conveyor sections, and wherein corresponding workpiece position data is used by said control system to control each corresponding said variable speed drive so as to interlock said adjacent conveyor sections as conveyor translation speed of said plurality of conveyor sections increases or decreases according to said control instructions from the control system, wherein said plurality of conveyor sections include a plurality of workpiece inspection conveyor sections for the simultaneous inspection of workpieces fed from an infeed section of said plurality of conveyor sections, wherein workpiece diverting means are provided for diverting workpieces from said infeed section to disperse said workpieces for inspection along said plurality of workpiece inspection conveyor sections, wherein said workpiece diverting means include a lugged inclined conveyor section for transporting workpieces from said infeed conveyor section to and past selectively actuable workpiece flow diverters for selectively diverting workpieces according to said control instructions to said plurality of said inspection conveyor sections so as to divide an infeed piece rate of said infeed conveyor section by the number of said inspection conveyor sections to thereby reduce the workpiece flow rate of workpieces on each workpiece inspection conveyor of said plurality of workpiece inspection conveyors.

7. The system of claim 6 wherein said workpieces are lumber to be graded and said plurality of workpiece inspection conveyor sections convey the lumber past corresponding lumber grading stations.

8. The system of claim 6 wherein a workpiece collection conveyor section downstream of said plurality of workpiece inspection conveyors cooperates with so as to collect the workpieces from said inspection conveyors and delivers the workpieces to an outfeed conveyor section.

9. The system of claim 8 wherein said inspection conveyors are substantially horizontal and said collection conveyor section is inclined.

10. The system of claim 9 wherein said inspection conveyors operate in parallel, and the workpieces are fed in serially on said infeed conveyor section and said inclined conveyor section, and are collected and fed out serially from said inspection conveyors.

* * * * *